United States Patent [19]

Hess

[11] 3,883,801
[45] May 13, 1975

[54] FAULT TESTING OF LOGIC CIRCUITS
[75] Inventor: Garry Carson Hess, Champaign, Ill.
[73] Assignee: Bell Telephone Laboratories, Incorporated, Murray Hill, N.J.
[22] Filed: Nov. 7, 1973
[21] Appl. No.: 413,674

[52] U.S. Cl............................................. 324/73 R
[51] Int. Cl............................................ G01r 15/12
[58] Field of Search................. 324/73; 235/153 AC

[56] References Cited
UNITED STATES PATENTS

| | | | |
|---|---|---|---|
| 3,621,387 | 11/1971 | Smith et al...................... | 324/73 R |
| 3,716,783 | 2/1973 | Deering............................. | 324/73 R |
| 3,740,646 | 6/1973 | McMahon, Jr. ..................... | 324/73 |
| 3,763,430 | 10/1973 | Terrey............................. | 324/73 R |

OTHER PUBLICATIONS
"Low cost, Go/No-Go IC Tester," The Electronic Engineer, Aug. 1967, pp. 82–83.

*Primary Examiner*—Stanley T. Krawczewicz
*Assistant Examiner*—Rolf Hille
*Attorney, Agent, or Firm*—C. S. Phelan

[57] ABSTRACT

A method and apparatus for detecting faults in logic circuits requires the retention of a single binary reference word for each circuit type to be tested. Responsive to a sequence of input binary words preselected to reveal potential faults of the circuit under test, a single binary word is derived, as a figure of merit, by adding the sequence of output binary words produced by the circuit under test. Comparison of the single binary word generated by the circuit under test with the reference binary word which is characteristic of a properly functioning circuit of the same type provides the desired fault indication. Economies of time and apparatus are thus realized.

11 Claims, 3 Drawing Figures

3,883,801

3,883,801

FAULT TESTING OF LOGIC CIRCUITS

FIELD OF THE INVENTION

This invention relates generally to circuit testing and more specifically to a method and apparatus for testing logic circuits including circuit packages, circuit cards and subsystems.

BACKGROUND OF THE INVENTION

A "logic circuit" is any electrical apparatus having only binary inputs and outputs and includes not only circuit packages but also logic cards and subsystems. Binary signals are comprised of a sequence of dual-valued symbols called bits. At any instant of time, the bits comprising the input signals constitute a binary number called an "input vector" and the output bits similarly constitute an "output vector". The terms "logic circuit" and "vector" are used throughout in the sense defined above.

Progress in integrated circuit technology has permitted single circuit packages the size of a postage stamp to do functions which formerly required racks of equipment. Consequently, the logic circuits employed in modern computers and other digital systems perform very complex functions and have relatively few terminals because of their small size. This presents a difficult problem in fault testing because only the input and output terminals are generally accessible. Thus, the conventional method of testing involves the application of a carefully chosen sequence of input vectors to exercise every potential fault of interest of the circuit under test, and the observation of the resulting output vector sequence. When a circuit is operating properly, a predetermined sequence of input vectors produces an expected sequence of output vectors; a faulty circuit produces an unexpected sequence of output vectors. In this manner the operability or inoperability of logic circuits is readily established. A discussion of this well-known and widely studied test method can be found in Chapter 3 of *Finite State Models for Logical Machines* by F. C. Hennie (John Wiley & Sons, 1968).

The problem with the conventional testing method is the requirement for excessive equipment, particularly for data storage. The sequence of input vectors must either be stored or generated. For each circuit type to be tested, the correct output sequence must be stored or otherwise made available while the circuit is tested. A useful tester must operate with a variety of circuit types and the expense and bulk of data storage can rapidly get out of hand.

Some prior art attempts at reducing equipment have provided for the comparison of the output vector sequence of a circuit under test with that of a standard circuit of the same type. Although such testers provide a considerable saving in memory, they require the maintenance of an operative standard circuit of each type to be tested and the tester itself cannot be used to test the standard circuit. Also, a self-test is not possible. Other prior art testers apply an input vector sequence to the circuit under test and count the number of data transitions at each output, in turn, to detect faults. These transition counts are compared to those obtainable with an operative circuit. In the testers of the aforementioned types, the testing of one output at a time is the usual method. This test procedure is particularly slow because a complete circuit test requires a multiplicity of individual tests with repeated application of the input test sequence.

One class of prior art testers tests the entire logic circuit in a single application of the input test sequence. In this type of tester, output vectors from the logic circuit under test are permitted to influence the next vector of the input test sequence, usually, by controlling the contents of a shift register. At the end of the test, a unique number results in the shift register if the circuit is operative. Although this type of tester realizes a considerable saving in equipment, it has the distinct disadvantage that the input sequence is not constant and it is not possible to guarantee that the input sequence generated will test for every potential fault of interest of the circuit under test. In addition, the determination of the terminal state of the shift register is complicated and often requires a computer.

It is an object of this invention to provide a simple and compact logic circuit tester that is small enough to be portable.

It is a further object of this invention to provide a logic circuit tester which is capable of readily performing a self-test.

It is yet another object of this invention to provide a logic circuit tester which does not require the maintenance of an operative standard logic circuit of each type to be tested.

It is still another object of this invention to provide a logic circuit tester which generates in a simple manner a predictable test sequence for application to the logic circuit under test in order to test for every potential fault of interest.

A further object of this invention is to provide a logic circuit tester which tests all of the outputs of a logic circuit simultaneously.

SUMMARY OF THE INVENTION

According to the invention, the same input vector sequence is generated for all circuit types and the resulting output vector sequence is added to arrive at a sum vector. This sum vector has a nearly unique value, that is, the faults which yield a sum vector identical to that resulting from an operative circuit are few, can be predicted and can be tested for by other means. Thus, the operability of a logic circuit is readily determined by comparing the resulting sum vector with that corresponding to an operative circuit. The invention requires only the generation of a fixed input vector sequence common to all circuit types and the storage of a single reference sum vector for each circuit type.

In accordance with a specific embodiment of the invention, the test sequence of input vectors is provided by a pattern generator incorporating a binary counter to produce the actual vector (binary number) sequence. An interchangeable interface matrix provides the necessary connections for each circuit type from the pattern generator, power and timing sources, and from ground to the circuit under test as well as providing the connections between the circuit under test and the accumulator which adds the output vector sequence. The correct sum vector is also programmed within the interface matrix as a wired sum. A comparator determines the conformity of the sum vector provided by the accumulator with the reference sum vector wired into the interface matrix. A fault indication results when the two vectors fail to conform.

It is a feature of this invention that the same input vector sequence is generated for all logic circuit types tested.

Another feature of this invention is that the output vector sequence produced by the logic circuit test is added to provide a sum vector.

Yet another feature of this invention is that only the sum vector corresponding to each circuit type to be tested need be stored.

Another feature of this invention is that the sum of the output vector sequence produced by a logic circuit is compared to a reference sum vector to determine the operability of the logic circuit.

BRIEF DESCRIPTION OF THE DRAWING

The objects, features and advantages of this invention are best understood by reference to the drawing in which.

DETAILED DESCRIPTION

Figure 1:
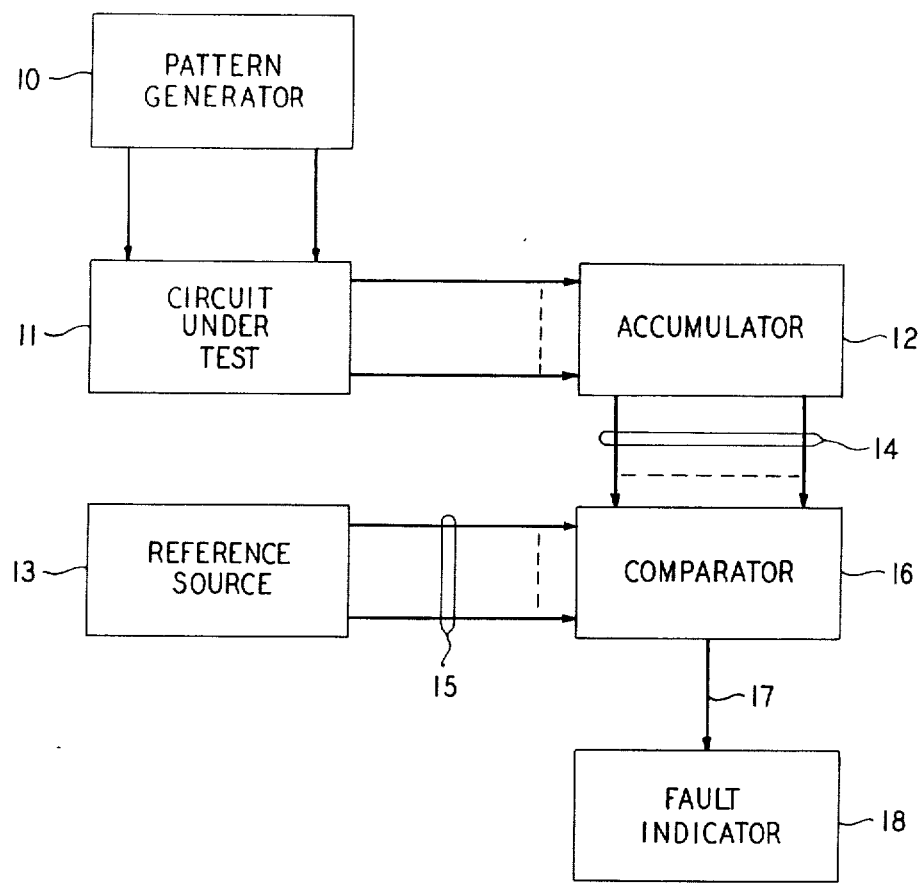
FIG. 1 is a functional block diagram of a logic circuit tester according to the invention.

FIG. 1 is a functional block diagram of a circuit tester according to the invention. Pattern generator 10 produces a sequence of input vectors for application to the circuit 11 under test. The resulting output vector sequence is applied to accumulator 12, which provides a vector signal to comparator 16 via leads 14. Reference source 13 provides its vector signal to comparator 16 via leads 15. Comparator 16 produces a logic signal on lead 17 to fault indicator circuit 18. The latter circuit exhibits a go-no go indication of the operability of the circuit under test after the entire input vector sequence has been applied.

In operation, pattern generator 10 provides on parallel output leads a predetermined input vector sequence that exercises every potential fault of circuit 11, and may also provide a homing sequence to bring circuit 11 to an initial reference state. The output leads are arbitrarily assigned weights (typically in powers of 2). It is immaterial which output provides a particular bit as long as consistency is maintained. The output vectors from circuit 11 under test are added as binary numbers in accumulator 12 to produce the sum vector on parallel leads 14. Reference source 13 generates a reference vector corresponding to the particular sum vector obtained with an operative circuit. Upon completion of the input vector sequence, comparator 16 compares the sum vector appearing on leads 14 with the reference sum vector appearing on leads 15. Fault indicator 18 responds appropriately to the binary output of comparator 16 to show operativeness or fault condition of the circuit under test.

From the foregoing description, it is clear that the logic circuit testing method of the invention includes the steps of 1. Exciting the logic circuit being tested with a pattern that can exercise all of its potential faults;

2. Performing a cumulative weighted summation on the signals from the output of the circuit under test to obtain a test sum signal; and 3. Comparing the test sum signal with a reference sum signal to determine the operability or fault condition of the circuit under test.

The reference sum value obtained with the operative circuit is readily determined by conventional Boolean methods as the sum of the output vector sequence corresponding to a given input vector sequence. This procedure need be performed only once for a particular circuit type and input sequence, and the result can be stored for future use.

Inasmuch as fault indications are binary in nature in the apparatus of this invention, it is possible that certain faults may produce an erroneous test sum vector identical to the standard sum vector. Fortunately, these undetectable self-canceling faults can be predicted and tested for by the other means or by rearranging the connections of the circuit inputs to pattern generator 10. Consequently, the method of predicting undetectable faults warrants further discussion.

In a circuit where a given fault always causes either erroneous 1s or erroneous 0s (but not both) at a given output, the value S of the sum vector, due to a fault $F_j$ in a circuit having $m$ outputs, is given by $$S = K + \sum_{i=1}^{m} A_i S_{ji} 2^{w_i} \quad (1)$$

where K is the sum vector value for an operative circuit. $A_i$ is 1 if $F_j$ causes an erroneous 1 or −1 if $F_j$ causes an erroneous 0 at the $i^{th}$ output. $S_{ji}$ corresponds to the number of times $F_j$ causes an error at the $i^{th}$ output and $w_i$ is the weight assigned to the $i^{th}$ output. The variables $A_i$ and $S_{ji}$ are characteristics of the particular circuit under test whereas $w_i$ is arbitrarily assigned to the outputs. As expected, erroneous 1s lead to a sum vector value that is too large, whereas erroneous 0s lead to one that is too small. A fault condition will be undetectable if it results in a value of S equal to K, that is, fault $F_j$ is undetectable if $$\sum_{i=1}^{m} A_i S_{ji} 2^{w_i} = 0. \quad (2)$$

Consequently, equation (2) identifies undetectable single faults. A similar procedure can be followed to derive equations that identify undetectable multiple faults.

Figure 2:
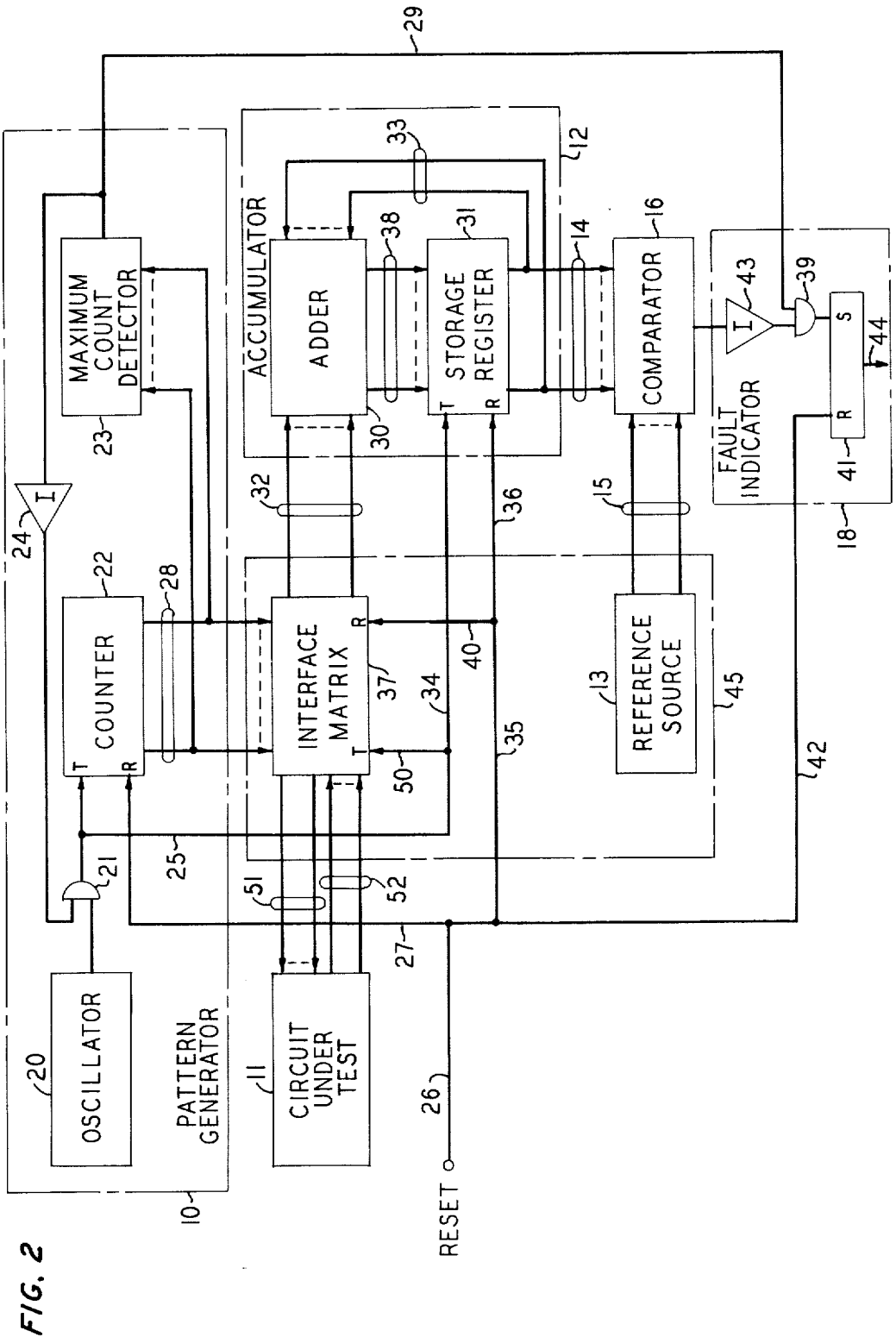
FIG. 2 is a logic block diagram of a preferred embodiment of the invention.

FIG. 2 is a logical block diagram of a preferred embodiment of the invention. Pattern generator 10, accumulator 12 and fault indicator 18 shown dashed in FIG. 2 correspond respectively to pattern generator 10, accumulator 12 and fault indicator 18 of FIG. 1. In addition, circuit under test 11, reference source 13, and comparator 16 are common to both figures.

Figure 3:
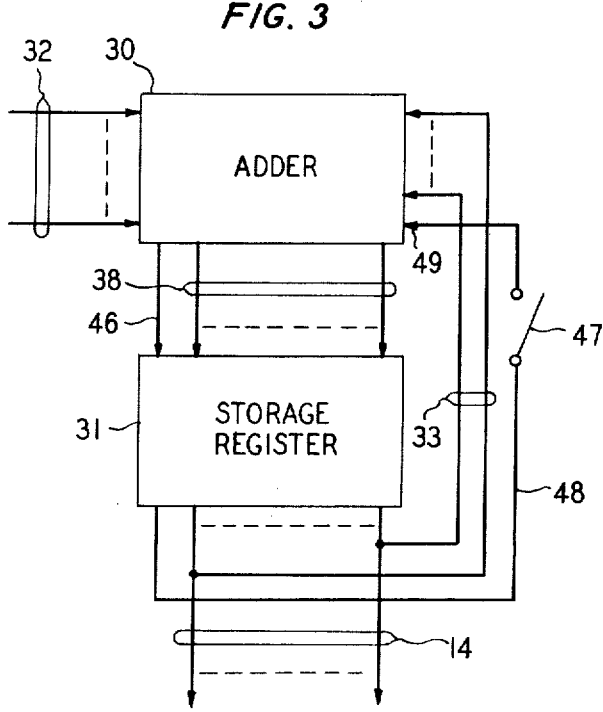
FIG. 3 is a logic block diagram of a modification of the preferred embodiment that permits self-testing with reduced equipment.

The logic functions used as building blocks in FIG. 2 and FIG. 3 are well known to the art. An inverter (such as elements 24 and 43) produces at its output the complement of a signal at its input. An AND gate (such as elements 21 and 39) provides an output signal which is the Boolean product of its input signals. A set/reset flip-flop (such as element 41) has two inputs, R (reset) and S (set), and one output. A logical 1 applied to the R input resets the flip-flop (output goes to logical 0) whereas a logical 1 applied to the S input sets the flip-flop (output goes to logical 1). A logical 0 on either input has no effect and simultaneous logical 1s (R and S) are not allowed. A binary counter (such as element 22) increments its output signal or count every time it receives a clock pulse on its timing input T and can be reset to an all-zero count by applying a pulse to its reset input R. A logic detector or decoder (such as element 23) is a combinatorial circuit which indicates the presence of a particular combination of input bits, usually by providing a logical 1 output. An interface matrix (such as element 37) is not a logic circuit, but rather a network with predetermined permanent connections among its inputs and outputs. Since the connections are permanent, such matrices are usually interchangeable to allow different connections for different applications. A binary adder (such as element 30) provides an output vector (number) equal to the arithmetic sum of two binary input vectors (numbers). In addition to the aforementioned inputs and output, an adder has a least significant carry input (shown only in FIG. 3) which is added to the least significant input bits and an overflow or most significant carry output (shown only in FIG. 3) which indicates that a particular sum has exceeded the capabilities of the adder. A storage register (such as element 31) comprises a plurality of storage cells for storing, under control of clock pulses (at the T input), input bits. The register is cleared (set to the all-zero state) by applying a pulse to its reset input R. A comparator (such as element 16) produces a logical 1 output when two binary input vectors are identical.

An external reset signal is applied on line 26. This reset signal is further applied to pattern generator 10 via lead 27 to interface matrix 37 via leads 35 and 40, to accumulator 12 via leads 35 and 36 and to the reset input of flip-flop 41 via lead 42.

Pattern generator 10 comprises oscillator 20, AND gate 21, counter 22, maximum count detector 23, and inverter 24. Oscillator 20 provides a train of clock pulses to AND gate 21, which also receives the output signal of maximum count detector 23 through inverter 24. The output of AND gate 21 is applied to counter 22 and to lead 25. The external reset signal applied via lead 26 is received by counter 22 on lead 27. Counter 22 produces a sequence of binary signals on leads 28. Maximum count detector 23 senses the signal on leads 28 to produce a logic 1 level when the maximum count is detected. The binary output of maximum count detector 23 is applied to inverter 24 and also appears on lead 29. In operation, a reset pulse on lead 27 initializes the count, causing the output of maximum count detector 23 to drop to the low (zero) condition. Consequently, AND gate 21 transmits the clock pulses from oscillator 20 to lead 25 and counter 22. Counter 22 increments its count on successive clock pulses and provides a sequence of vectors on leads 28. When the maximum count is reached, the output of maximum count detector 23 goes high to provide an end of test indication (logical 1) on lead 29 and to disable AND gate 21. As a result, transmission of clock pulses to lead 25 and counter 22 terminates and counter 22 becomes inactive.

From the foregoing description, it is clear that pattern generator 10 provides the following signals: a sequence of binary vectors on leads 28; clock pulses for operating accumulator 12 and circuit 11 (through interface matrix 37) on lead 25; and an end-of-test indication on lead 29.

The sequence of binary vectors produced by pattern generator 10 on leads 28 is provided to interface matrix 37. The clock pulses produced by pattern generator 10 on lead 25 are provided to interface matrix 37 via lead 46 and to accumulator 12 via lead 34. The end-of-test signal produced by pattern generator 10 is applied to AND gate 39 via lead 29.

Interface matrix 37 provides direct connection to circuit 11 under test of all necessary signals and also provides direct connection of the output vector from circuit 11 to accumulator 12. This matrix 37 receives the test sequence on leads 28, reset pulses on lead 40, and clock pulses on lead 50. In addition, it is assumed that all voltage sources, grounding and other signals normally required to operate logic circuits, although not shown, are provided to the tester as a whole and are available to matrix 37 for provision to circuit 11. All of the above-mentioned signals are directly connected by matrix 37 to leads 51 and thereby to circuit 11. In addition, interface matrix 37 provides direct connections between leads 52 and leads 32 and thereby to accumulator 12.

Accumulator 12 comprises adder 30 and storage register 31. Adder 30 receives a sequence of vectors on leads 32 and the current output vector of storage register 31 via leads 33. Storage register 31 receives the clock pulses from pattern generator 10 via leads 25 and 34 and the output vector of adder 30 via leads 38. In addition, the external reset signal applied to lead 26 is received by storage register 31 via leads 35 and 36. The output vector of storage register 31 appears on leads 14. This corresponds to the cumulative sum vector appearing on leads 14 in FIG. 1. In operation, every reset pulse applied to lead 26 resets storage register 31 to the all-zero state. Adder 30 continuously produces on leads 38 the sum of the vectors appearing on leads 32 and leads 33. The sum vector resulting on leads 38 is stored in register 31 when a clock pulse appears on lead 34. Thus, accumulator 12 produces an updated intermediate sum of the vectors appearing on leads 32 each time a clock pulse is received.

The cumulative sum vector from accumulator 12 is provided to comparator 16 via leads 14 and the reference sum vector is provided via leads 15 from reference source 13. The output signal of comparator 16 is provided to AND gate 39 through inverter 43 and the output of this gate is applied to the S input of flip-flop 41. A signal indicative of the operability of circuit under test 11 appears on lead 44.

In operation a test is started when a reset pulse is applied to lead 26. This sets counter 22 and storage register 31 to the all-zero state, resets flip-flop 41 and, when necessary, resets circuit 11 (through matrix 37). As previously described, pattern generator 10 provides clock pulses on lead 25, an input test sequence of vectors on lead 28, and an end-of-test indication on lead 29. The clock pulses and test sequence are applied to operate circuit 11 under test through interface matrix 37. Every potential fault of circuit 11 under test is exercised resulting in a sequence of output vectors which is applied to accumulator 12 through interface matrix 37 and leads 32. As previously described, accumulator 12 produces on lines 14 the updated cumulative sum of vectors from circuit 11 under test coincident with each clock pulse from pattern generator 10. The cumulative sum of output vectors, which appears on leads 14, is continuously compared with the corresponding value from reference source 13 in comparator 16. The comparator in turn provides a logical 1 output only if both its input vectors are identical. When the test is complete, clock pulses terminate and no further change can occur in the cumulative sum appearing on leads 14. In addition, the end of test indication provided by functional block 10 on lead 29 enables AND gate 39. If at this time the two input vectors to comparator 16 are not identical, a logical 1 is applied to the S input of flip-flop 41 producing a fault indication (logical 1) on line 44. If the two input vectors applied to comparator 16 are identical, flip-flop 41 is left undisturbed and an operative circuit under test is indicated.

Different circuits under test will generally require different interface matrices because of differing arrangements of input and output terminals. In addition, the correct sum vector is usually different for different logic circuits. Consequently, interface matrix 37 as well as reference source 13 must be interchangeable if a universal tester is desired. One possible method of achieving this is to provide an interface matrix for each type of circuit to be tested and to include a reference source in each type of matrix in the form of a wired binary number. This feature is indicated in FIG. 2 by dashed box 45 which represents a single interchangeable circuit containing an interface matrix and a wired reference source. An alternate approach would be to provide interchangeable matrices and to make reference source 13 adjustable.

A self-test is easily performed in the arrangement of FIG. 2 by providing an interface matrix that connects leads 28 directly to leads 32 and a reference source with the reference sum vector value for a self-test. Experience has shown that because the vectors appearing on leads 32 are then added directly, this self-test requires more stages in adder 30 and storage register 31 than most circuits that are to be tested.

FIG. 3 illustrates a modification of functional block 12 which permits the performance of a self-test with the smaller adder 30 and storage register 31 used in testing circuits. This modification of functional block 12 exactly replaces functional block 12 of FIG. 2 and is connected in an identical fashion to the remainder of the tester. This modification makes use of the overflow output and the carry input of adder 30 which were not employed in the embodiment of FIG. 2. An extra stage is added to storage register 31 to accommodate the overflow bit which is provided via lead 46. The output of the storage register is fed back to the carry input 49 of adder 30 through switch 47 and via lead 48. As in FIG. 2, a sequence of vectors appears on leads 32 and the sum vector appearing on leads 14 is fed back to adder 30 via leads 33. With switch 47 open operation is identical to that of functional block 12 in FIG. 2. When switch 47 is closed for self-test operation, overflow bits are fed back to adder 30 and thereby affect the value of the sum vector appearing on leads 14. Since the overflow is now no longer lost, a smaller adder and register than would usually be required can be used for self-test. This method can also be used to test certain circuits that would require unusually long adders and registers.

While this invention has been disclosed in terms of a particular illustrative embodiment, it will be apparent to those skilled in the art that many modifications are possible within the spirit and scope of the disclosed principles.

What is claimed is:

1. A logic circuit tester of the type in which a sequence of input vectors activates a logic circuit under test to yield a corresponding sequence of output vectors, said tester comprising:
    an accumulator for summing the sequence of output vectors from the logic circuit under test into a single characterizing test sum vector,
    means for adding the overflow bit of said accumulator to the least significant input bit thereof,
    a reference source providing a reference sum vector characterizing a properly functioning logic circuit of the type under test, and
    a comparator responsive jointly to the respective test and reference sum vectors for indicating the state of correspondence thereof and hence the state of operativeness of the logic circuit under test.

2. In a tester for logic circuits the method of detecting faults in the logic circuits comprising the steps of:
    applying a predetermined input test sequence to said logic circuit,
    adding the corresponding sequence of output signals from said logic circuit to obtain a single test sum signal,
    adding carries from the most significant bit of said single test sum signal to the sequence of output signals at the least significant bit thereof, and
    testing for the correspondence of the single test sum signal with a predetermined reference sum signal characteristic of a fault-free logic circuit of the same type.

3. The logic circuit tester of claim 1 further comprising a plurality of interchangeable interface matrices, each one employed with a different type of logic circuit, each of said matrices comprising:
    means for applying a predetermined number of bits of the vectors of said input sequence to the inputs of said logic circuit,
    means for applying the sequence of output vectors to said accumulator, and
    means for applying said reference sum vector to said comparator.

4. The logic circuit tester of claim 1 further comprising a single interface matrix useful for self-testing said tester, said interface matrix comprising:
    means for applying said sequence of input vectors directly to said accumulator, and
    means for applying to said comparator a reference sum vector equal to the sum of said sequence of input vectors.

5. In a logic circuit tester of the type in which a sequence of input vectors activates a logic circuit under test to yield a corresponding sequence of output vectors, said tester including means for combining said sequence of output vectors into a single characterizing test sum vector, the improvement comprising:
    means for adding the most significant output bit of said combining means to the least significant bits of said output vector sequence.

6. An apparatus for fault testing logic circuits having pluralities of input and output points, said apparatus comprising:
    an oscillator providing a stream of clock pulses at a convenient rate,
    resettable means for counting said clock pulses up to a predetermined number, an accumulator for summing a sequence of binary vectors applied to its input points, means for applying the most significant output bit of said accumulator to the least significant carry input thereof, an interface matrix for applying the count from said counting means to the input points of said logic circuit and for applying the signals appearing at the output points of said logic circuit as input vectors to said accumulator, a source of a reference vector indicative of a properly operating logic circuit of the type under test, and means responsive to the attainment of the predetermined number in said counting means for indicating a lack of correspondence between the accumulator sum and said reference vector thereby denoting a fault in said logic circuit.

7. The apparatus of claim 6 further comprising a plurality of different matrices, each one useful with a different type of logic circuit and each one interchangeable with said interface matrix, each one of said plurality of matrices comprising:

means for coupling a predetermined number of bits of the count from said counting means to the input points of said logic circuit, means for coupling the signals appearing at the output points of said logic circuit as input vectors to said accumulator, and means for coupling said reference vector to said indicating means.

8. The apparatus of claim 6 in which a testing interface matrix is substituted for said interface matrix to permit self-testing of the apparatus, said testing interface matrix comprising:

means for coupling the count from said counting means directly to said accumulator as input vectors, and means for coupling to said indicating means a reference vector equal to the sum of the counts from saiad counting means.

9. In a logic circuit tester including an accumulator for adding a sequence of vectors, the method of self-testing said tester comprising the steps of:

applying a sequence of test vectors to said accumulator to produce a single test sum vector, adding carries from the most significant bit of said single test sum vector to the sequence of test vectors at the least significant bit thereof, and checking for the correspondence of the single test sum vector with a predetermined reference sum vector characteristic of a fault-free tester.

10. The logic circuit tester of claim 1 in which said accumulator comprises a multidigit binary full adder including an overflow output bit and a least significant carry input bit, a multidigit storage register cooperating with said binary full adder to hold intermediate values of said test sum vector and means for coupling each digit of said storage register, other than the digit holding said overflow bit, to the corresponding input digit of said binary full adder; and said overflow bit adding means comprises a lead connecting the storage register digit holding said overflow bit to the least significant carry input of said binary full adder.

11. The logic circuit tester of claim 6 in which said accumulator comprises a multidigit binary full adder including an overflow output bit and a least significant carry input bit, a multidigit storage register cooperating with said binary full adder to hold intermediate values of said test sum vector and means for coupling each digit of said storage register, other than the digit holding said overflow bit, to the corresponding input digit of said binary full adder; and said overflow bit adding means comprises a lead connecting the storage register digit holding said overflow bit to the least significant carry input of said binary full adder.

* * * * *